(12) United States Patent
Doerr

(10) Patent No.: US 6,445,847 B1
(45) Date of Patent: *Sep. 3, 2002

(54) APPARATUS AND METHOD FOR ACHIEVING A SMOOTH SPECTRAL RESPONSE OPTICAL FILTER

(75) Inventor: Christopher Richard Doerr, Middletown Township, NJ (US)

(73) Assignee: Lucent Technologies Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/428,907
(22) Filed: Oct. 28, 1999

Related U.S. Application Data

(60) Provisional application No. 60/121,498, filed on Feb. 24, 1999.

(51) Int. Cl.$^7$ ................................. G02B 6/28
(52) U.S. Cl. ..................... 385/24; 385/46; 359/120
(58) Field of Search .......................... 385/24, 27, 43, 385/37, 39, 2, 3, 31, 15, 17; 359/120, 121; 372/20

(56) References Cited

U.S. PATENT DOCUMENTS 5,889,906 A * 3/1999 Chen .......................... 385/28
5,926,298 A * 7/1999 Li ............................... 385/27

OTHER PUBLICATIONS

C. Doerr, L. W. Stultz, M. Cappuzzo, E. Laskowski, A. Paunescu, L. Gomez, J. V. Gates, S. Shunk, and A. E. White, "40–wavelength add–drop filter," to appear in IEEE Photon. Lett.

* cited by examiner

*Primary Examiner*—Cassandra Spyrou
*Assistant Examiner*—Euncha Cherry
(74) *Attorney, Agent, or Firm*—John Caccuro

(57) ABSTRACT

A design technique minimizes the loss and ripple in the spectral response of an optical filter formed using a pair of gratings connected by an array of optical elements. This filter can be, for example, two waveguide grating routers (WGRs) connected by an array of waveguides. Each WGR includes two star couplers connected by waveguide grating arms. The smoothest spectral response is achieved for a given set of connecting waveguides, by choosing the number of grating arms less than or equal to filling the star coupler central Brillouin zone made by the set of connecting waveguides resulting in the connecting waveguides neither substantially over- or under-sampling the optical spectrum from the waveguide gratings. Exactly filling the Brillouin zone with the grating arms minimizes the loss, and so is the preferred choice.

16 Claims, 5 Drawing Sheets

APPARATUS AND METHOD FOR ACHIEVING A SMOOTH SPECTRAL RESPONSE OPTICAL FILTER

This application claims the priority date of the corresponding provisional application, Serial No. 60/121,498, filed Feb. 24, 1999.

FIELD OF THE INVENTION

The invention relates generally to optical filters and, more particularly, to minimizing loss and ripple in such filters.

BACKGROUND OF THE INVENTION

Many systems, such as wavelength division multiplexing (WDM), require filters with a relatively flat and smooth-topped spectral response. The prior art has shown that one can construct a filter with a flat spectral response by cascading two waveguide grating routers (WGRs) [1] (Note in this specification, a reference to another document is designated by a number in brackets to identify its location in a list of references found in the Appendix) I focus here on filters that consist of two cascaded gratings, such as waveguide gratings, connected by two or more connecting optical elements, such as waveguides, (which we will sometimes refer to as "back-to-back gratings"), such as shown in FIG. 1. Examples of such filters include wavelength cross connects [2] wavelength equalizers [3], and wavelength add/drops [8].

Such back-to-back gratings do not generally exhibit a flat spectral response, and thus there is a need for providing design criteria for minimizing the loss and ripple in the spectral response through such back-to-back gratings.

SUMMARY OF THE INVENTION

In accordance with the present invention, I describe a design technique for minimizing the loss and ripple in the spectral response through a pair of gratings, such as waveguide gratings, connected by an array of optical elements, such as waveguides. I achieve the smoothest spectral response for a given set of connecting optical elements by choosing the aperture size of the grating to fill the central Brillouin zone (i.e., central diffraction order) as determined by the connecting optical elements. Exactly filling the Brillouin zone with the grating minimizes the loss, and so is the preferred choice.

More particularly, for the case of waveguide gratings, my low-ripple and low-loss spectral response optical filter includes two cascaded waveguide grating routers connected by a set of waveguides, each waveguide including a phase shifter, switch, shutter, couplers, amplifiers, and/or mirror. Each waveguide grating router comprises a pair of star couplers interconnected by a waveguide grating, each waveguide grating router further characterized in that the number of grating arms in the waveguide grating is chosen so as to fill, not substantially more or substantially less, the central Brillouin zone of each star coupler, as determined by the set of connecting waveguides for which one desires a ripple-free and low-loss spectral response.

According to my method, a low-ripple and low-loss spectral response is produced for an optical filter formed from two cascaded waveguide grating routers connected by a set of waveguides, where each waveguide grating router comprises a pair of star couplers interconnected by a waveguide grating. The method includes the steps of (1) determining the set of connecting waveguides for which one desires a ripple-free and low-loss spectral response and (2) selecting the number of grating arms in the waveguide grating so as to fill, not substantially more or substantially less, the central Brillouin zone of each star coupler, as determined by the set of connecting waveguides.

DETAILED DESCRIPTION

Figure 1:
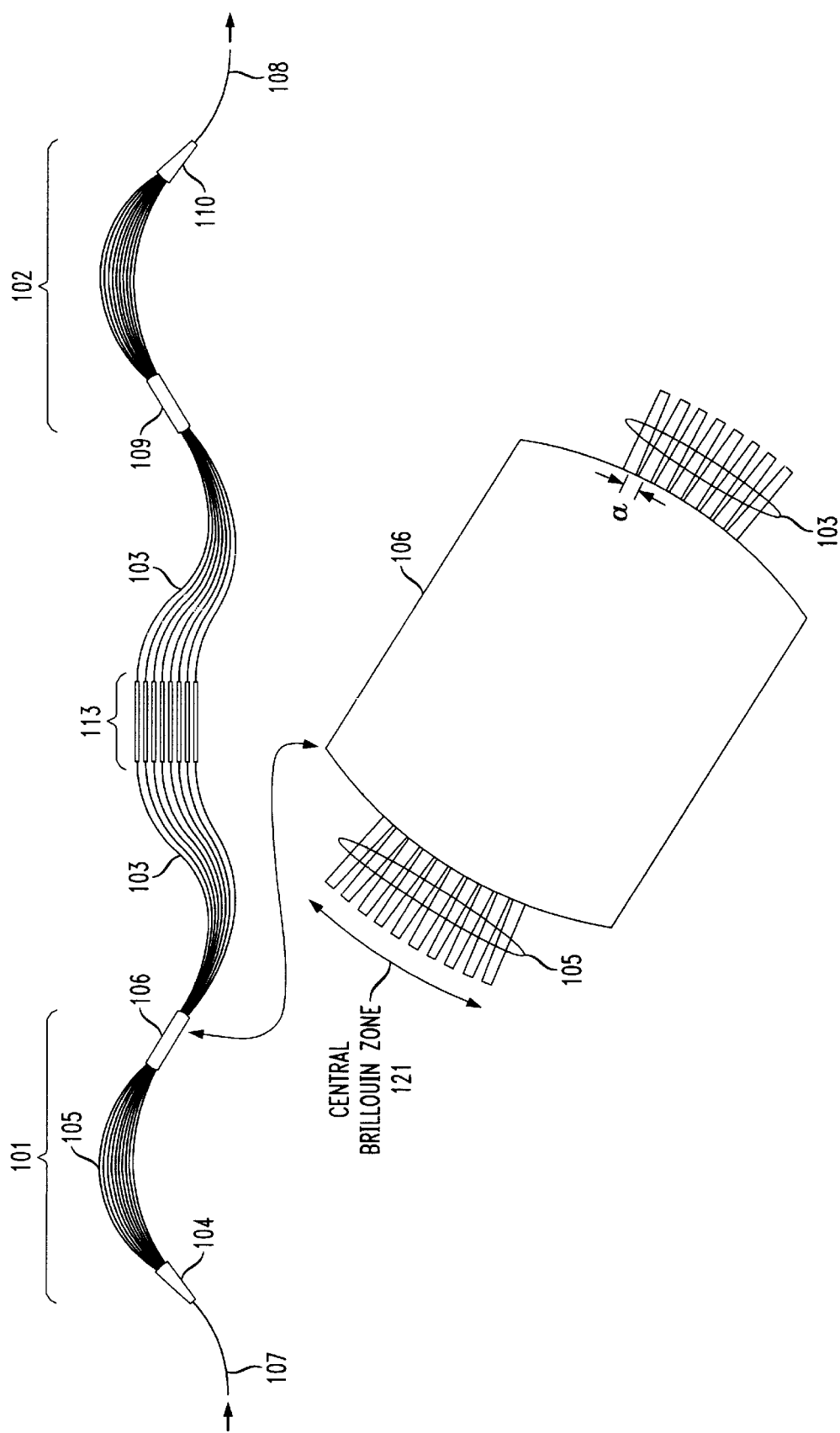
FIG. 1 shows a am of an illustrative back-to-back waveguide grating router (WGR) arrangement in which the present invention may be utilized.

In accordance with my invention, I minimize the loss and ripple in the spectral response through an optical filter implemented using a pair gratings connected by an array of optical elements. I will focus first on the case where the gratings are waveguide grating routers (WGRs), and the connecting optical elements are waveguides. With reference to FIG. 1, there is shown a diagram of an illustrative optical filter implemented using back-to-back WGRs which is useful in discussing the operation of the present invention. As shown, a first WGR 101 connects to a second WGR 102 via an array or set of waveguides 103. The waveguides may contain optical elements 113 such as phase shifters, switches, couplers, amplifiers, and/or mirrors. For the purposes of the present invention, the first WGR 101 does not have to be identical to the second WGR 102.

Figure 3:
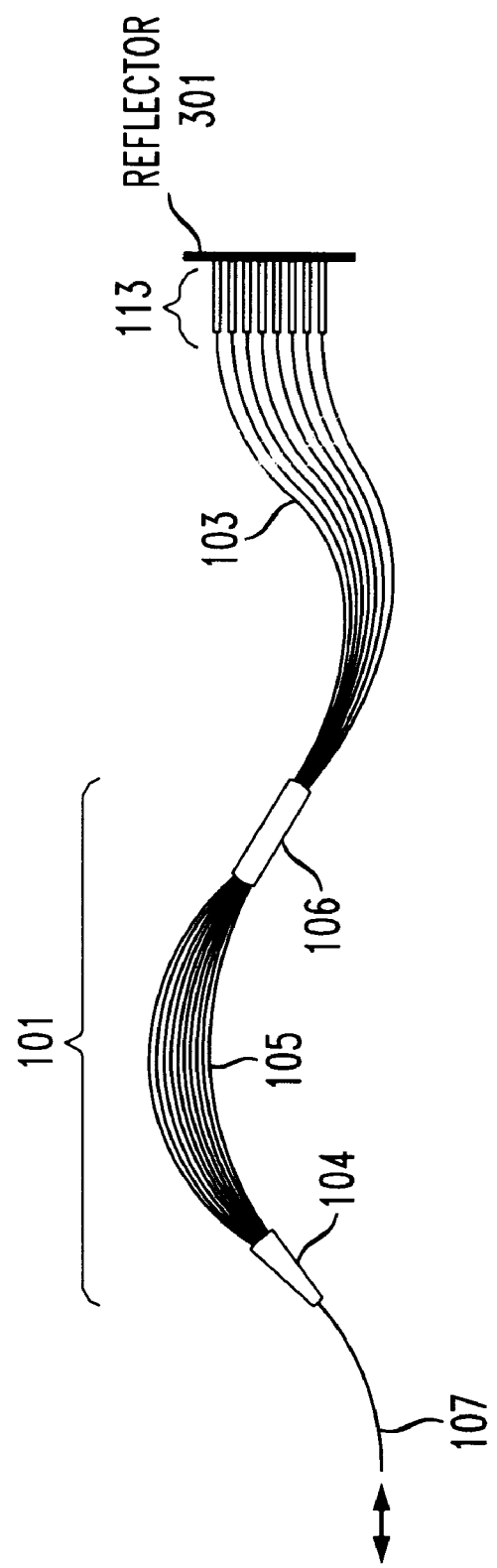
FIG. 3 shows a reflective embodiment of the arrangement of FIG. 1.

With reference to FIG. 3, the invention may also be implemented in a reflective geometry, in which the arrangement of FIG. 1 is split in half and the connecting waveguides 103 are terminated using mirrors. In this implementation, the WGR 101 performs the function of WGR 101 of FIG. 1 for incoming signals and performs the function of WGR 102 for the signals reflected by reflector (or mirror) 301.

Input waveguide 107 connects to star coupler 104 of WGR 101. Output waveguide 108 connects to star coupler 110 of WGR 102. Each of the WGRs 101 and 102 includes a first star coupler, e.g., 104 connected using a group of grating waveguides, e.g., 105 to a second star coupler, e.g., 106. The more detailed illustration of star coupler 106 shows the group of grating waveguides 105 connection to an input port side of star coupler 106 occurring within the central Brillouin zone, as determined by the star coupler 106 port spacing of the connecting waveguides. If the connecting waveguide center-to-center port spacing coupler 106 is "a", then the Brillouin zone width angle is $\lambda/a$, where X is the wavelength of interest in the free-space region. It is likewise with star coupler 109. The port waveguide width 103 may be the same or vary gradually from port to port. The sets of connecting waveguides 103 are substantially evenly spaced in angle in their connections to the star couplers 106 (and 109).

Illustratively, the FIG. 1 waveguide grating routers 101 and 102 may be implemented as described in prior art references [4,5,6] as consisting of two star couplers [7] connected by an array of waveguides. In the following paragraphs, I determine a design criterion for the number of grating arms (105) of two WGRs (101, 102) connected by an array of waveguides (103) to create a maximally flat-topped, i.e., smooth and ripple-free, response with minimum loss.

Lemma 1: The optimum number of input ports in a star coupler to obtain the maximum power transfer through it for all possible inputs is that which makes the input ports exactly occupy one Brillouin zone.

Proof of Lemma 1: Assume that on one side of the star coupler the ports are spaced by $\Delta\theta_1$, and on the other side they are spaced by $\Delta\theta_2$. Further assume that $\Delta\theta_1 \Delta\theta_2 = 2\pi/(kRM)$, where k and R are the star-coupler propagation constant and radius, respectively, and M is an arbitrary integer. If the input to each port $m_1$ of side 1 of the star coupler is $u_1(m_1)$, then the output from each port $m_2$ on side 2 is given by [7]

$$f_2(m_2)u_2(m_2) = \sum_{m_1} \exp(j2\pi m_1 m_2 / M) f_1(m_1) u_1(m_1) \quad (1)$$

where $f_1$ and $f_2$ are fixed functions determined by the star-coupler geometry. One can see from Eq. (1) that if M sequential values of $u_2(m_2)$ are known, then all the values of $u_2$ are known. Thus exactly 2M real numbers are needed to completely determine the total field transmitted through the star coupler. Thus the input must consist of exactly M ports, otherwise the transmissivity to unwanted optical fields (radiation modes) must be nonzero for an arbitrary optical input. The Brillouin zone width is defined by the spatial period of the fields in the star coupler and is equal to $M\Delta\theta_1$ and $M\Delta\theta_2$ for sides 1 and 2, respectively. Thus in order to minimize the loss through a star coupler for any amplitude distribution, the input ports must exactly occupy one Brillouin zone. Overfilling a Brillouin zone will force some of the power to not couple to the waveguides and thus the total power transfer through the star coupler will necessarily depend on the input amplitude distribution.

Theorem 1: The optimum number of grating arms to obtain the lowest loss at all wavelengths in a desired range for a given star coupler geometry, and hence the smoothest possible spectral response, through a pair of back-to-back WGR's is that which makes the grating-side ports of the two middle star couplers exactly occupy one Brillouin zone (i.e., when the number of grating arms in each WGR exactly equals the number of channels in that WGR's free-spectral range).

Proof of Theorem 1: A pair of back-to-back WGR's consists of four star couplers in series connected by waveguide arrays, as shown in FIG. 1. We number the star couplers #1 to #4 going from left to right (104, 106, 109, 110, respectively, in FIG. 1). Because the outer two waveguide arrays, the gratings, have unequal waveguide path lengths, then if the input comes from the left side, and we consider all the wavelengths at once, then at the grating-side of star coupler #2 the amplitude distribution can be arbitrary. Thus we can employ Lemma 1 and state that the optimum number of grating arms in the left-hand WGR to obtain the maximum power transfer at all wavelengths through the system is that which exactly fills one Brillouin zone on the grating side of star coupler #2. Because there are only a single input (waveguide 107) and a single output (waveguide 108) to the structure, the transmissivity must be the same for both optical travel directions through the device. Thus the right-hand WGR grating arms must also occupy exactly one Brillouin zone. Otherwise the transmissivity through the structure will necessarily vary with wavelength, resulting in spectral ripple. Note that Theorem 1 is a necessary, but not sufficient condition to achieve a ripple-free spectral response. Other conditions include having $f_1$, $f_2$, and the connecting waveguide lengths and losses all vary slowly (as compared to that in the waveguide gratings) from waveguide to waveguide.

Theorem 1 gives the criteria that the connecting waveguides neither substantially over- or under-sample the optical spectrum from the waveguide gratings.

Figure 2:
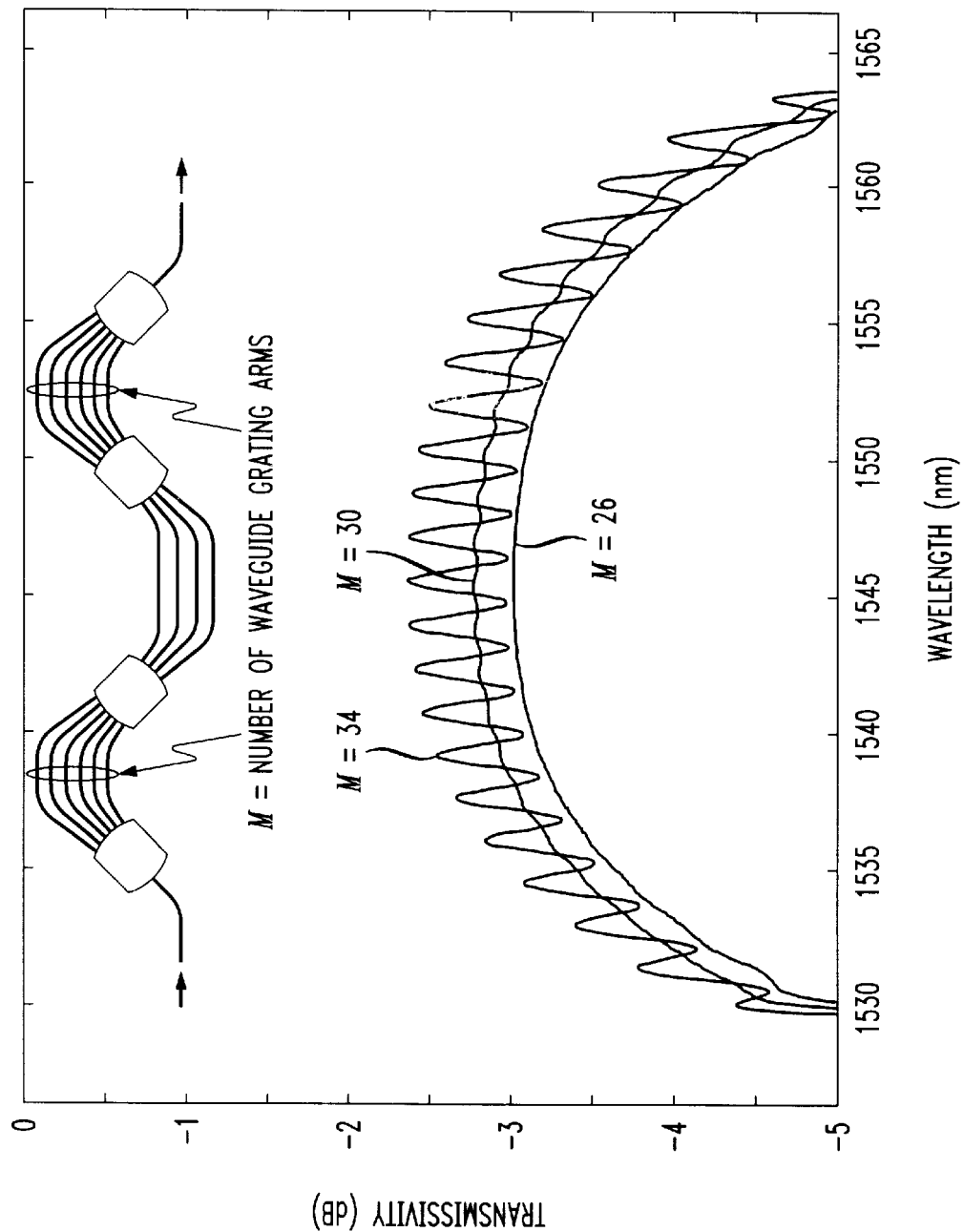
FIG. 2 shows a simulated spectral response of two identical back-to-back WGRs connected by an array of equal length waveguides, using Fourier optics, when the grating port Brillouin zone is exactly (M=30), over (M=34), and under (M=26) filled.

As a demonstration of Theorem 1, FIG. 2 shows the calculated response (using Fourier optics) through two back-to-back conventional WGRs (101, 102) having free-spectral ranges of 30 channels and connected by 22 equal-length waveguides (103) connected to the central 22 channels of each WGR. In FIG. 2, the channel spacing is 200 GHz. The curve M=30 depicts the result when the number of grating ports 105 exactly fills the central Brillouin zone 121 (i.e., central star coupler diffraction order). The curve M=34 shows the result when the number of grating ports 105 over fills the central Brillouin zone 121. Conventional WGRs, as in references [4]–[6], have grating arms that significantly overfill the Brillouin zone, as determined by the output/input port array. The curve M=26 shows the result when the number of grating ports 105 under fill the central Brillouin zone 121. The change in the grating-arm number, M, is achieved by either adding to or eliminating the outermost grating arms of the waveguide grating, e.g., 105.

As shown in FIG. 2, with over filling, M=34, the spectrum breaks up into ripples, and with under filling, M=26, the overall loss is increased. The smoothest spectral response is achieved for a given set of connecting waveguides by choosing the number of grating arms less than or equal to filling the central Brillouin zone (i.e., M=30) made by the set of connecting waveguides. When M equals 30, the number of channels in one free-range, the lowest loss and flattest response is achieved (the central Brillouin zone is exactly filled). Thus, for the case of M=30 grating arms per WGR, the WGR passbands have just the right overlap for creating a ripple-free response. The result shown in FIG. 2 exists regardless of port waveguide widths 103 (as long as the variation from port to port is slow), chirping of the waveguide grating, etc., making this a fabrication-robust design method.

Note that in practice, one may use dummy grating waveguides that fall outside of the central Brillouin zone in order to improve the illumination uniformity of the grating, especially in the presence of mutual coupling among the grating waveguides. However, since these dummy grating waveguides are broken and do not transmit light between the star couplers, they are not true waveguide grating arms and so are ignored when applying the above design rules.

Figure 4:
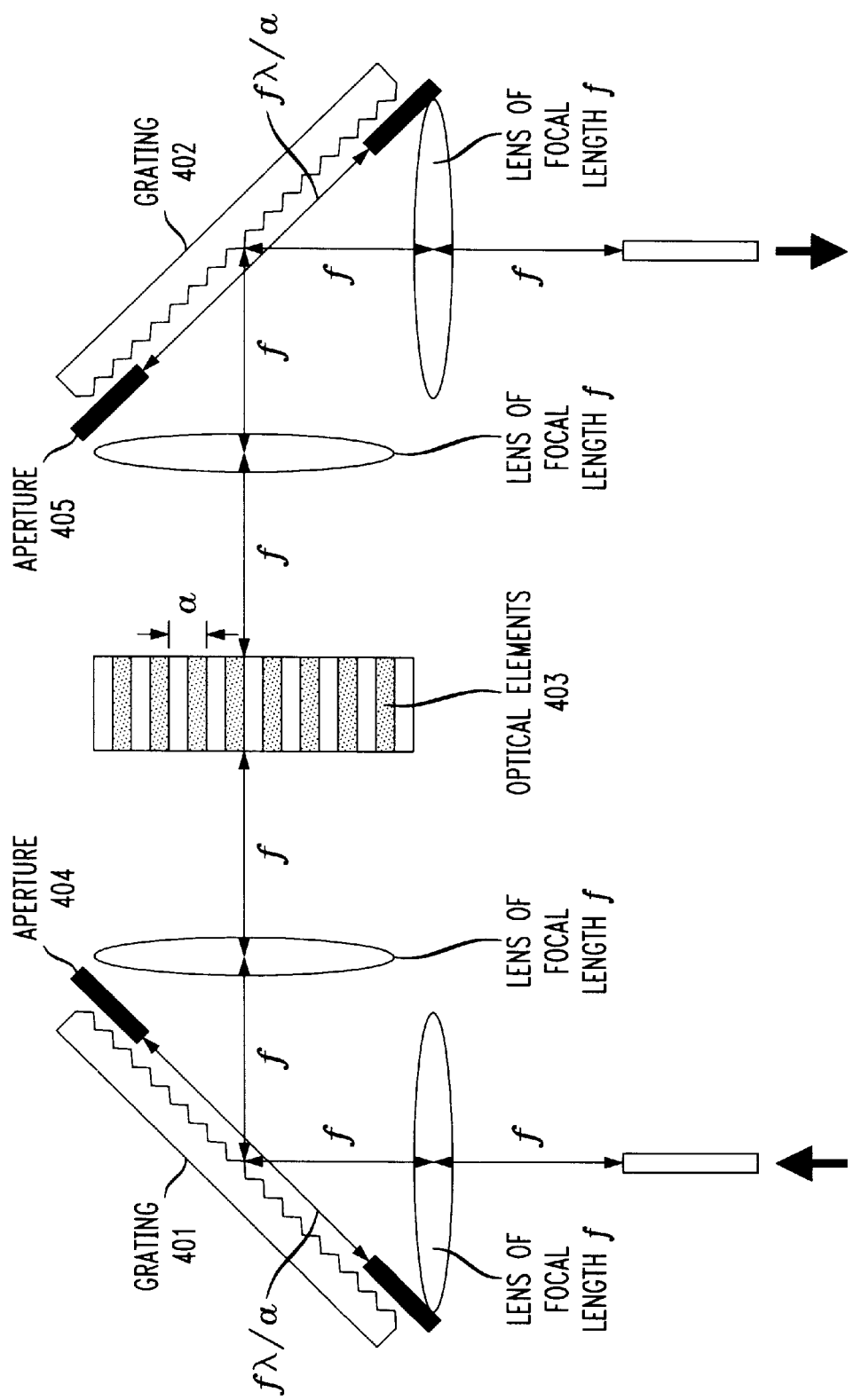
FIG. 4 shows a diagram of a back-to-back diffraction grating arrangement in which the present invention may be utilized.
Figure 5:
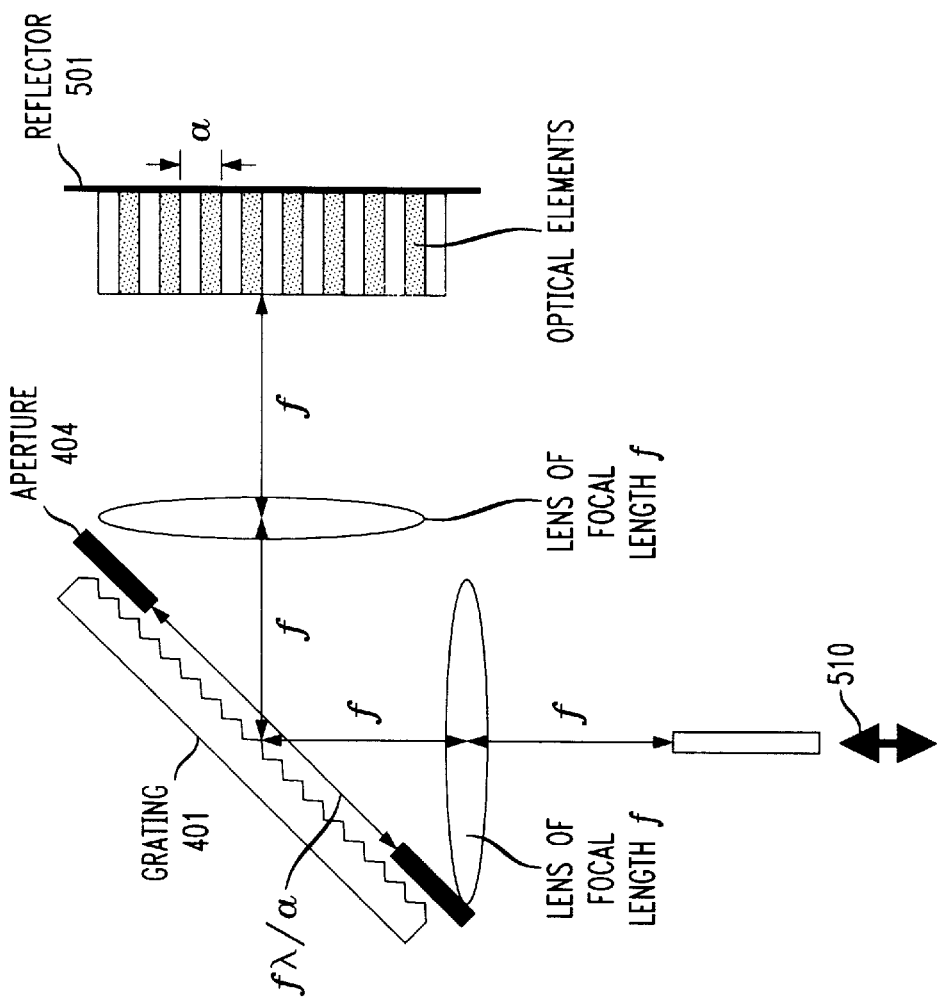
FIG. 5 shows a reflective embodiment of the arrangement of FIG. 4.

As shown in FIG. 4, this technique can be generalized to any type of grating, such as a reflective diffractive grating (e.g., 401 and 402). In such a case, if there is a periodic array of optical elements 403, such as waveguides, phase shifters, switches, shutters, amplifiers, polarization converters, and/or mirrors, with spatial period "a", between the gratings, then the spectral ripple and loss will be minimized by ensuring that the gratings exactly fill the Brillouin zones as determined by the periodic array. This can be enforced by using an aperture 404 (and 405) having a spatial width $f\lambda/a$, as shown in FIG. 4. As shown in FIG. 5, the arrangement of FIG. 4 may also be implemented in a reflective geometry. In such a reflective geometry arrangement, the reflector 501 enables the grating 401 and aperture 404 to act on both the incoming and outgoing (reflected) optical signals 510.

In conclusion, I have described a necessary condition on the grating aperture for minimizing the ripple and loss in the spectral response through a pair of back-to-back gratings. Specifically, my technique minimizes ripple and loss in a spectral response optical filter formed from two cascaded gratings connected by a set of optical elements. For the case waveguide gratings, each WGR comprises a pair of star couplers interconnected by a waveguide grating, such optical devices may be made using planar silica, planar InP, or similar technology. The two-grating or single-grating and reflector unit arrangements may be used to implement a wavelength equalizer, a programmable filter, a wavelength add/drop unit, a a wavelength cross connect, or other similar devices. My design method includes the steps of (1) determining the set of connecting waveguides 103 for which one desires a ripple-free and low-loss spectral response and (2) selecting the number of grating arms 105 in the waveguide grating(s) so as to fill, not substantially more or substantially less, the central Brillouin zone of each star coupler, as determined by the set of connecting waveguides.

What has been described is merely illustrative of the application of the principles of the present invention. Other methods and arrangements can be implemented by those skilled in the art without departing from the spirit and scope of the present invention.

Appendix

REFERENCES

[1] C. Dragone, "Efficient techniques for widening the passband of a wavelength router," J. Lightwave Tech., vol.16, pp.1895–1906, 1998.

[2] C. R. Doerr, "Proposed WDM cross connect arrangement of waveguide grating routers and phase shifters," IEEE Photon. Technol. Lett., vol.10, pp.528–530, 1998.

[3] C. R. Doerr, C. H. Joyner, and L. W. Stulz, "Integrated WDM dynamic power equalizer with potentially low insertion loss," IEEE Photon. Technol. Lett., vol. 10, pp. 1443–1445, 1998.

[4] M. K. Smit and C. van Dam, "Phasar based WDM devices: Principles, design and applications," IEEE J. Select. Topics Quantum. Electron., vol.2, pp.236–250, 1996.

[5] H. Takahashi, S. Suzuki, K. Kato, and I. Nishi, "Arrayed-waveguide grating for wavelength division multi/demultiplexer with nanometer resolution," Electron. Left., vol.26, pp.87–88, 1990.

[6] C. Dragone, "An N×N optical multiplexer using a planar arrangement of two star couplers," IEEE Photon. Technol. Lett., vol.3, pp.812–815, 1991.

[7] C. Dragone, "Efficient N×N star couplers using Fourier optics," J. Lightwave Technol., vol.7, pp.479–489, 1989.

[8] C. Doerr, L. W. Stultz, M. Cappuzzo, E. Laskowski, A. Paunescu, L. Gomez, J. V. Gates, S. Shunk, and A. E. White, "40- wavelength add-drop filter," to appear in IEEE Photon. Left., Nov., 1999.

What is claimed is:

1. An optical filter including one or more waveguide grating routers connected to a set of waveguides, each waveguide grating router comprising a pair of star couplers interconnected by a waveguide grating, each waveguide grating router characterized in that the number of grating arms in the waveguide grating is chosen to substantially equal the number of wavelength channels in the spectral range of that waveguide grating router, said wavelength channels being equally spaced, the resulting optical filter having low-loss and an essentially ripple-free, spectral response.

2. The optical filter of claim 1 including one grating router and further including a reflecting means connected by the waveguides to the one grating router.

3. The optical filter of claim 2 wherein one or more of the connecting set of waveguides contain an optical element selected from a group including a phase shifter, a switch, a shutter, a coupler, a polarization converter, an amplifier, and a mirror.

4. The optical filter of claim 2 wherein the waveguide grating router and waveguides are arranged to form a wavelength equalizer, a programmable filter, or a wavelength add/drop unit.

5. The optical filter of claim 1 including two grating routers which are connected by the waveguides.

6. The optical filter of claim 5 wherein the number of grating arms slightly underfills the central Brillouin zone of each star coupler.

7. The optical filter of claim 5 wherein the two cascaded waveguide grating routers are not identical.

8. The optical filter of claim 5 wherein the connecting waveguide widths are not identical.

9. The optical filter of claim 5 wherein the connecting waveguides have substantially equal lengths.

10. The optical filter of claim 5 wherein there is substantial mutual coupling among the connecting set of waveguides.

11. The optical filter of claim 5 wherein the number of grating arms, M, substantially equals the number of channels in a grating free-spectral range.

12. The optical filter of claim 5 wherein one or more of the connecting set of waveguides contain an optical element selected from a group including a phase shifter, a switch, a shutter, a coupler, a polarization converter, an amplifier, and a mirror.

13. The optical filter of claim 5 wherein the two waveguide grating routers are arranged to form a wavelength equalizer, a programmable filter, or a wavelength add/drop unit.

14. The optical filter of claim 5 wherein the two waveguide grating routers are made from material selected from a group including planar silica and planar InP technology.

15. The optical filter of claim 5 wherein the connecting waveguides are evenly spaced in angle in their connection to each star coupler.

16. A method of producing a low-loss and an essentially ripple-free spectral response optical filter from one or more waveguide grating routers connected to a set of waveguides, each waveguide grating router comprising a pair of star couplers interconnected by a waveguide grating, the method including the steps of:

selecting the number of grating arms in the waveguide grating to substantially equal the number of wavelength channels in the spectral range of that waveguide grating router, setting the spacing of said wavelength channels to be equal, and wherein the resulting optical filter exhibits a low-loss and an essentially ripple-free spectral response.

* * * * *